United States Patent [19]

Delacou

[11] Patent Number: 4,737,872

[45] Date of Patent: Apr. 12, 1988

[54] HIGH DENSITY ELECTRICAL CONNECTOR FOR USE WITH ROTATING HEAD MAGNETIC RECORDING APPARATUS

[75] Inventor: Jean-Michel Delacou, Rueil-Malmaison, France

[73] Assignee: Enertec, Montrouge, France

[21] Appl. No.: 942,107

[22] Filed: Dec. 16, 1986

[30] Foreign Application Priority Data

Dec. 20, 1985 [FR] France ................................ 85 18980

[51] Int. Cl.$^4$ .............................................. G11B 5/52
[52] U.S. Cl. ........................................ 360/108; 439/18
[58] Field of Search ............... 360/108, 107, 104, 137; 439/11, 13, 18, 21, 66, 807

[56] References Cited

U.S. PATENT DOCUMENTS

| | | | |
|---|---|---|---|
| 3,179,909 | 4/1965 | Cheney | 336/120 |
| 3,985,413 | 10/1976 | Evans | 439/66 |
| 4,210,945 | 7/1980 | Laurentiev et al. | 360/108 |
| 4,400,751 | 8/1983 | Tominaga | 360/108 |

OTHER PUBLICATIONS

IBM Technical Disclosure Bulletin, vol. 22, No. 4, Sep. 1979, p. 1531, New York, U.S.; F. A. Almquist: "Zero Insertion Force Socket for Grid Modules".

*Primary Examiner*—John H. Wolff
*Attorney, Agent, or Firm*—Dale Gaudier

[57] ABSTRACT

The connector comprises: a central shaft (7) at the periphery of which linear conductor elements are longitudinally disposed, at least in a zone of contact provided on the shaft; a group (22) of radially disposed resilient conductors having conductive ends bent substantially into conformity with a toroidal surface centred on and facing towards the shaft (7) at a certain level of the zone of contact; resilient toroidal couplings (27,28) centred on the shaft (7) and surrounding said ends; a clamp (22,29) for compressing said couplings radially so as to urge, at the time of said compression of the couplings, the conductive ends radially inwardly into pressure contact with the longitudinal conductor elements of the shaft. This connector forms part of a rotor carrying magnetic heads of apparatus (FIG. 2) for recording on and playing back magnetic tape.

9 Claims, 3 Drawing Sheets

HIGH DENSITY ELECTRICAL CONNECTOR FOR USE WITH ROTATING HEAD MAGNETIC RECORDING APPARATUS

This invention relates to a high density electrical connector, suitable among other things for fitting to a rotating head magnetic recorder.

BACKGROUND OF THE INVENTION

Apparatus for recording on and playing back from magnetic tape (in particular video recordings), of the type in which a tape passes helicoidally in front of a slot separating two drums while magnetic heads carried by a disc of a rotor pass at high speed in front of the slot, is known. An apparatus of this type is described in the SMPTE Journal of December 1979, vol. 88, no. 12, p. 823 et seq (cf more particularly FIG. 13 with its rotating transformers).

Because of the extreme precision required for the movements of the magnetic heads, the shaft of the rotor is mounted in ball-bearings and subjected to rigorous machining operations after which it must be considered undismountable. However, the magnetic heads which move at a high linear speed (for example, 60 m/sec) have a shorter life than the mechanical assembly of the apparatus, and must therefore be changed during maintenance. The heads are therefore provided on a unit removable from the rotor. Rotating transformers permit the electric signals to be transmitted from the rotor to the fixed part of the apparatus and vice versa. In the known apparatus, the magnetic heads are connected by fixed connections to the rotating transformers of the rotor, such that these must be housed in the removable part of the rotor. As a result, the head-carrying part and the transformers are positioned in an overhung manner on the shaft of the rotor, ie outside the portion of the shaft between the bearings. This can result, at high rotational speeds, in problems of flexing of the shaft of the rotor. These problems are not generally perceptable for video apparatus, where the number of tracks necessary, and thus the number of transformers is very reduced.

On the other hand, for applications which require a high number of tracks and transformers (for example recording digital signals at high frequencies), it is no longer possible to mount the transformers in an overhung manner. It would be desirable to position them on the shaft between the bearings, on condition that it should be possible to establish an easily disconnectable connection between the magnetic heads and the transformers. such connection necessarily being of high density, given the restricted space available, and resistant to very high rotational speeds (for example from 4000 to 13000 r.p.m.).

SUMMARY OF THE INVENTION

The object of the invention is to provide a connector meeting these requirements.

To this end, the invention provides a connector which comprises:

a central member including a shaft at the periphery of which linear conductor elements are longitudinally disposed, at least in a zone of contact provided on the shaft;

a radial member comprising at least a group of radially disposed conductors having conductive ends bent substantially into conformity with a toroidal surface centred on and facing towards the shaft at a certain level of the zone of contact, each end being in a respective radial plane of said toroidal surface also containing a longitudinal conductor and at a certain distance from said longiutindal conductors of the shaft;

a toroidal elastic coupling centred on the shaft at the same level as the zone of contact, at a radial distance from the longitudinal conductors equal or greater than that of said conductive ends, and surrounding said ends; and a device for radially compressing said toroidal coupling so as to urge, at the time of said compression of the coupling the conductive ends radially inwardly into pressure contact with the longitudinal conductor elements of the shaft.

An electrical connection is thus made between the network of longitudinal conductors and the network of radial conductors, a connection which is easy and quick to establish as well as to disconnect (by removing the action of the radial compression device).

It is intended that the qualification of the conductors as radial or longitudinal applies only to the neighbourhood of the zone of contact; outside that, the arrangement of the conductors depends on the application intended.

Advantageously, the radial compression device comprises a conical-surface clamp. A screw-nut system permits the opposing surfaces of the clamp to be brought together or moved apart.

Advantageously, the connector comprises an alignment means for ensuring the angular coincidence between the longitudinal conductors and the radial conductor ends.

Advantageously, the longitudinal conductors are disposed in longitudinal grooves in the shaft. The grooves can accommodate two or more radial levels of conductors, the zone of contact thus also comprising two or more levels of contact. In this case in particular, it is advantageous that the radial member should comprise two groups of interlaced radial conductors associated with two resilient toroidal couplings.

To ensure their resilience, the radial conductors are made from an alloy of copper and beryllium, in the respective advantageous proportions of 98% and 2%.

The connector of the invention is particularly suitable for fitting to the head-carrying rotor of magnetic recording and playback apparatus of the type mentioned earlier.

Advantageously, the longitudinal conductors are connected to the windings of rotating transformers housed between two support bearings of the shaft of the rotor. Advantageously, the radial conductors are formed on a contact disc trapped between two plates of the rotor.

BRIEF DESCRIPTION OF THE DRAWINGS

Other advantages and characteristics of the invention will become apparent from the following description of a preferred embodiment. It will be made with reference to the attached drawings, in which.

DETAILED DESCRIPTION OF A PREFERRED EMBODIMENT OF THE INVENTION

Figure 1:
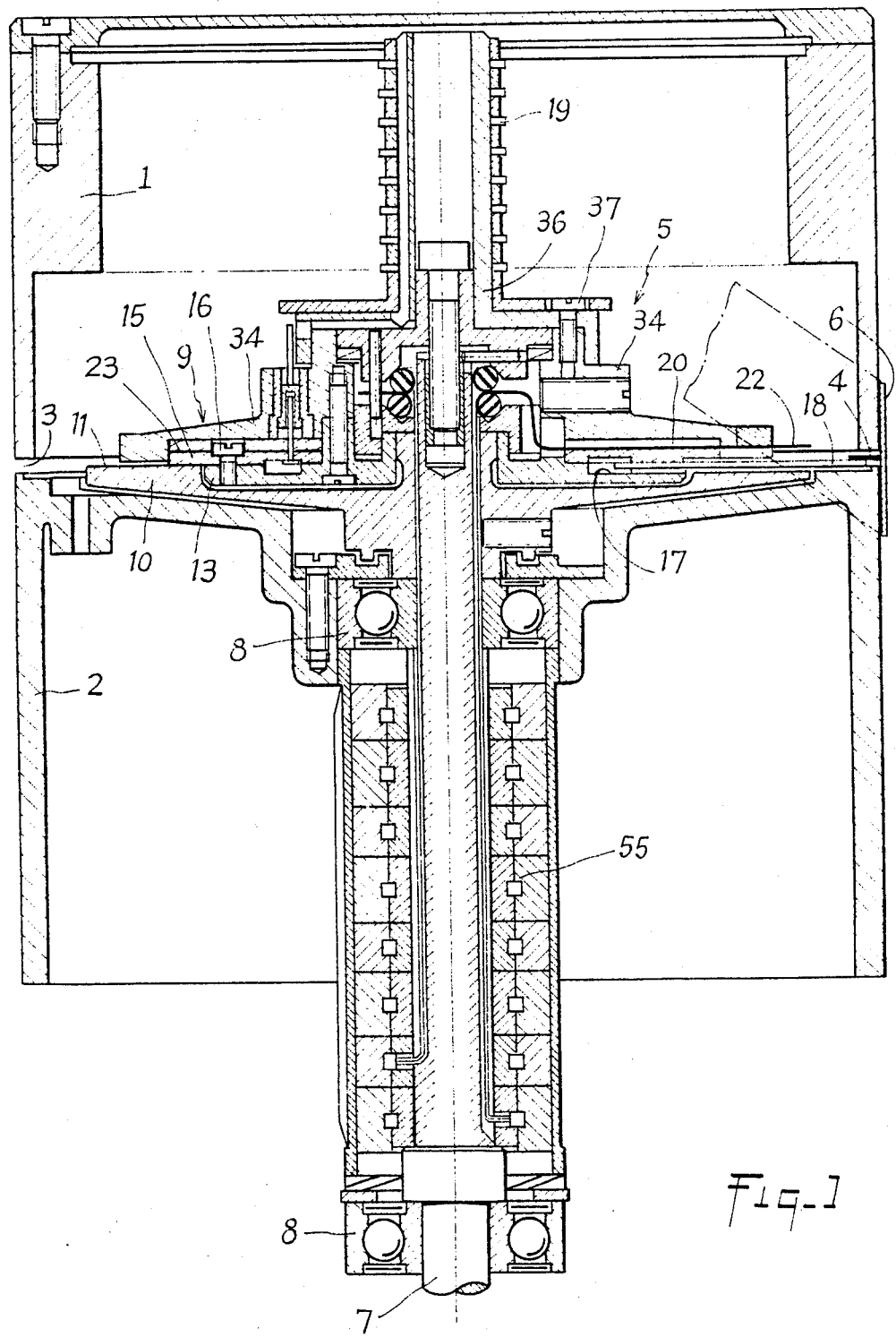
FIG. 1 is a longitudinal section of a magnetic tape recording and playback device incorporating the connector of the invention.
Figure 2:
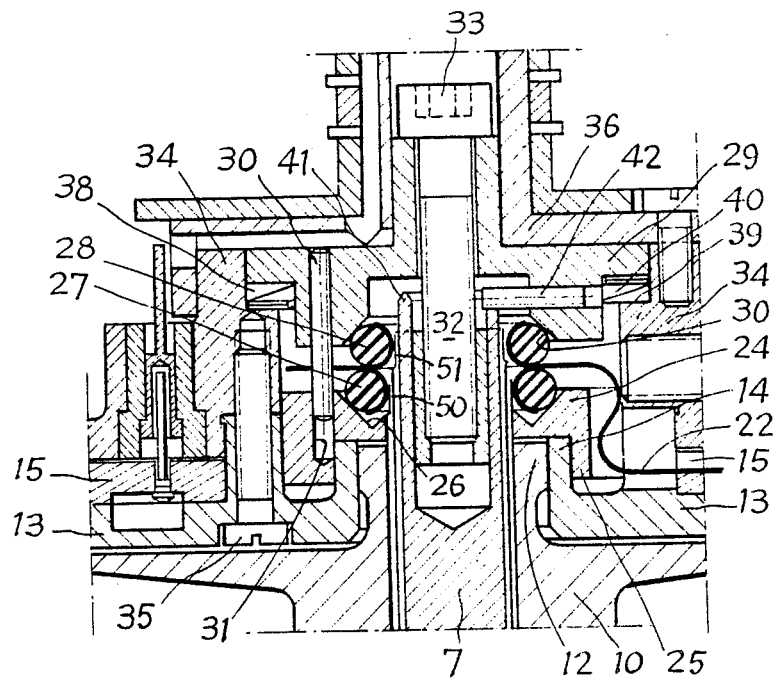
FIG. 2 is a more detailed view of part of FIG. 1, showing the connector more clearly.

FIG. 1 shows two fixed hollow drums, a lower one 1 and an upper one 2, defining between them a peripheral slot 3. A certain number of magnetic heads 4 are mounted at the periphery of a rotor 5 itself mounted inside the drums 1 and 2.

The heads 4 successively pass, in the slot 3, in front of a magnetic tape 6, itself passing helically over the drums 1 and 2 in front of the slot 3. The rotor comprises a shaft 7 rotatably supported by ball bearings 8 appropriately fixed to the frame of the apparatus or to the drums (themselves fixed to the frame), and a head-carrying wheel 9 mounted in an overhung manner with respect to the bearings 8.

The wheel 9 comprises a lower plate 10 shrunk-fit or bonded to the shaft 7, and having a flat face 11 in which an annular housing is hollowed out and a central flange is precision machined.

The plate 10 is intended for receiving a head-carrying annulus comprising a lower side plate 13 with a hub 14 and an upper side plate 15, clamped one against the other by circumferentially distributed bolts 16. Radial cavities 17 are provided in the facing surfaces of the side plates 13, 15, in which are housed and fixed one end of radial head-carrying arms 18. These arms 18 are constituted by bimetallic strips permitting a small vertical displacement of the heads. Slip rings 19 positioned at the end of the shaft 7 are associated with an electric supply device (not shown), and transmit via conductors (also not shown) electrical energy for supplying the bimetallic strips.

The upper side plate 15 comprises on its upper face radial housings (recesses) 20 intended for receiving the arms 21 of two radial groups 22 of conductors (FIG. 3) which will be described hereinafter in more detail.

The head-carrying annulus 13-15 is centred coaxially on the plate 10 by the co-operation of the flange 12 and the hub 14. The annulus 13-15 rests on the plate by virtue of abutment surfaces 23.

An annular clamp 24 caps the hubs 14, by virtue of a centering flange 25, and comprises a frusto-conical support surface 26 for a resilient toroidal coupling 27.

A toroidal coupling 28 is positioned on the coupling 27, with two sets of connection wires disposed between the couplings.

A clamp 29 with a frusto-conical bearing surface 30 is positioned on top of the coupling 28. The clamp 29 is coaxial with, and solid in rotation with, the clamp 24 by virtue of cylindrical pins 47 fixed in the clamp 29 but capable of sliding axially in housings in the clamp 24. A screw-nut system 32 connected to the shaft 7 permits the clamp 29 to be moved closer to the shaft 7 by rotating the hollow head 33.

An upper plate 34 is secured to the side plates 13,15 by bolts 35, while a bush 36 intended to carry the slips rings 19, is secured to the upper plate 34 by a flange and bolts 37.

The plate 34 includes a cylindrical cavity 38 allowing the clamp 29 to move axially, and a shoulder 39 serving to support a spring washer 40 on which the clamp 29 is supported.

The end 41 of the shaft 7 is hollow, and a slot in its edge permits precise angular positioning by means of a pin 42 coupled to the clamp 29.

Figure 3:
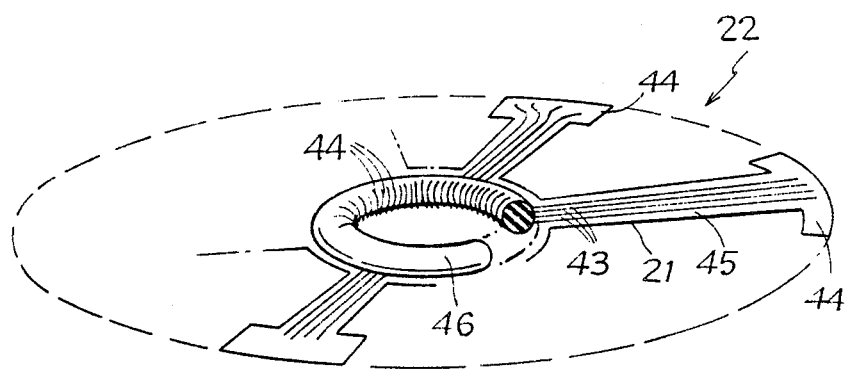
FIG. 3 is a partial schematic perspective view of the radial part of the connector.
Figure 4:
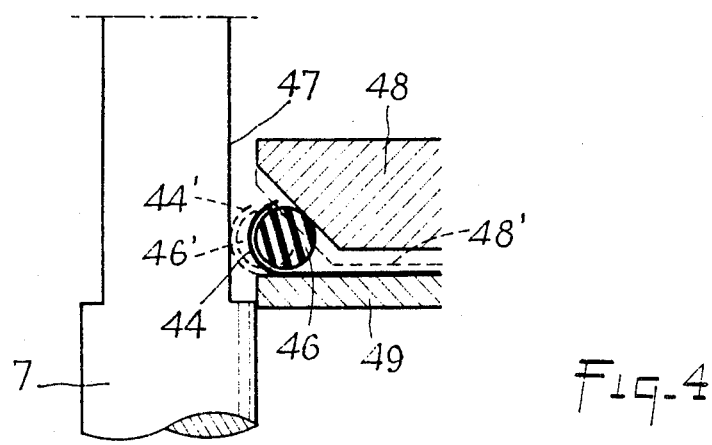
FIG. 4 is a partial schematic section of the connector, showing two steps of the radial compression of the toroidal coupling.

FIGS. 3 and 4 show a radial conductor group, in a slightly simplified form to clarify the explanation.

The group 22, in the general form of a disc, comprises a certain number of conductors 43 grouped in radial arms 21 of which the ends 44 further from the centre can be spread out to effect more easily the connections (not shown) with the magnetic heads 4.

Towards the centre of the group 22, the conductors 43 collect together and terminate in bent resilient wires 44.

The conductors 43, made from a Cu.Be alloy of high elastic limit, are advantageously obtained by chemical machining, and are clamped between two layers of flexible insulator 45 (for example in "Kapton"-Registered Trade Mark).

The toroidal curvature of the central wires 44 tends to make it take up a shape similar to that of the coupling 46, which coupling is, when in its rest state, of an internal diameter slightly greater than the external diameter of the zone of contact 47 provided on the shaft 7. Likewise, the curvature of the wires 44 is such that, at rest, said wires are spaced apart from the zone of contact 47 (cf FIG. 4). The coupling 46 is positioned between the opposing elements of a conical surface clamp 48 and an opposing surface 49.

When the clamp 48 approaches the plate 49 to adopt the position 48 (in dotted lines), it compresses the coupling 46 which takes up the position 46' in which it presses the wires 44' against the zone of contact 47 of the shaft 7, and therefore establishes connection between the conductors on the shaft and the conductors of the group 22.

With reference again to FIGS. 1 and 3, it will be noted that two groups 22 are interlaced and that for reasons of accommodation in the zone, their geometry towards the centre is suitably adapted.

The central wires of the two groups 22 are bent in opposite directions. The zone of contact comprises two levels of contact 50 and 51 of different diameter. The diameter of the couplings 27 and 28 are also slightly different. When the hollow head 33 is screwed in, the couplings 27 and 28 are compressed between the conical walls of the clamp 29 and the opposing clamp 24 such that they press the central wires of the two groups 22 against their respective level of the zone of contact.

Figure 5:
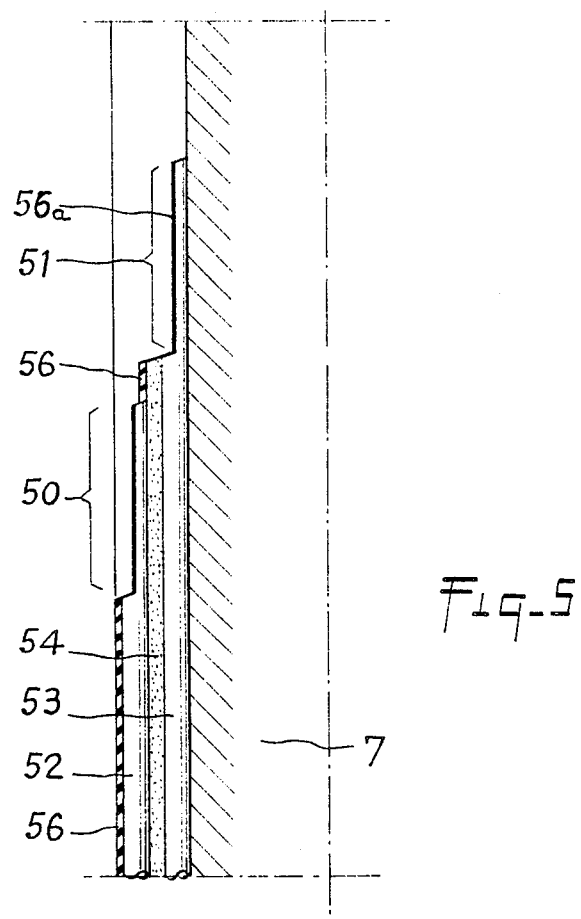
FIG. 5 is a partial view showing the detail of a two level zone of contact on the shaft of the rotor.

FIG. 5 shows the detail of the arrangement of the zones of contact on the shaft 7.

The shaft 7, at least in its portion intended to receive the conductors (that is to say from the zone of contact to the rotating transformers) is constituted by an aluminium rod having grooves in its periphery (for example 32 grooves on an axis of 6 mm in diameter). Each groove accommodates two conductors 52,53 separated by an insulator 54 (for example of "Kapton"), carrying electrical current respectively to and from the rotating transformers 55 associated with them.

The radially inner wire 53 of the windings and the external resin wrapping 56 are machined to half their combined thickness, at their ends corresponding to the zone of contact 51, and covered with an electrolytic deposition of gold 56a, forming a level of contact 2 mm long and 0.3 mm wide intended for one central contact wire of a group 22. Similarly, the radially outer wire 52, forms, after machining, a second level of contact at the level of the zone of contact 50.

I claim:

1. A high density electrical connector, comprising:
   a central member including a shaft at the periphery of which linear conductor elements are longitudinally disposed, at least in a zone of contact provided on the shaft;
   a radial member comprising at least a group of radially disposed conductors having conductive ends bent substantially into conformity with a toroidal surface centred on and facing towards the shaft at a certain level of the zone of contact, each end being in a respective radial plane of said toroidal surface also containing a longitudinal conductor and at a certain distance from said longitudinal conductors of the shaft;
   a toroidal elastic coupling centred on the shaft at the same level as the zone of contact, at a radial distance from the longitudinal conductors equal or greater than that of said conductive ends, and surrounding said ends; and a device for radially compressing said toroidal coupling so as to urge, at the time of said compression of the coupling, the conductive ends radially inwardly into pressure contact with the longitudinal conductor elements of the shaft.

2. A connector according to claim 1, wherein the radial compression device comprises a conical surface clamp.

3. A connector according to claim 1, further comprising an alignment means for ensuring the angular coincidence between the longitudinal conductors and the radial conductor ends.

4. A connector according to claim 1, wherein the longitudinal conductors are disposed in longitudinal grooves in the shaft.

5. A connector according to claim 1, wherein the radial member comprises two groups of interlaced radial conductors associated with two resilient toroidal couplings.

6. A connector according to claim 1, wherein the radial conductors are made from an alloy of copper and beryllium.

7. Magnetic tape recording and playback apparatus comprising a rotating magnetic head assembly including a rotor incorporating a connector in accordance with claim 1, the shaft of the connector constituting the shaft of the rotor.

8. Apparatus in accordance with claim 7, further comprising a pair of longitudinally spaced bearings for rotatably supporting the shaft, and wherein the longitudinal conductors are connected to the windings of rotating transformers housed between the bearings.

9. Apparatus according to claim 7, wherein the radial conductors are formed on a contact disc trapped between two plates of the rotor.

* * * * *